US005654073A

United States Patent [19]

Swiszcz et al.

[11] Patent Number: 5,654,073

[45] Date of Patent: Aug. 5, 1997

[54] TREATED FABRIC PANEL

[75] Inventors: Paul G. Swiszcz; Wendell B. Colson, both of Boulder, Colo.

[73] Assignee: Hunter Douglas Inc., Upper Saddle River, N.J.

[21] Appl. No.: 477,526

[22] Filed: Jun. 7, 1995

Related U.S. Application Data

[62] Division of Ser. No. 791,156, Nov. 13, 1991.

[51] Int. Cl.[6] .......... B32B 5/16

[52] U.S. Cl. .......... 428/116; 428/192; 428/193; 428/194; 428/212

[58] Field of Search .......... 428/116, 117, 428/192, 193, 195, 196, 212, 194

[56] References Cited

U.S. PATENT DOCUMENTS

| | | |
|---|---|---|
| Re. 26,444 | 8/1968 | Paige . |
| 765,412 | 7/1904 | Bugwig . |
| 2,610,934 | 9/1952 | Steele . |
| 2,734,843 | 2/1956 | Steele . |
| 3,074,839 | 1/1963 | May et al. . |
| 3,077,223 | 2/1963 | Hartsell et al. . |
| 3,082,141 | 3/1963 | Steele et al. . |
| 3,166,456 | 1/1965 | White et al. . |
| 3,189,501 | 6/1965 | White . |
| 3,769,060 | 10/1973 | Ida et al. . |
| 4,276,345 | 6/1981 | Maranghi . |
| 4,288,485 | 9/1981 | Suominen . |
| 4,307,768 | 12/1981 | Anderson . |
| 4,388,354 | 6/1983 | Suominen . |
| 4,450,027 | 5/1984 | Colson . |
| 4,603,072 | 7/1986 | Colson . |
| 4,631,108 | 12/1986 | Colson . |
| 4,631,217 | 12/1986 | Andersen . |
| 4,673,600 | 6/1987 | Anderson . |
| 4,676,855 | 6/1987 | Anderson . |
| 4,677,012 | 6/1987 | Anderson . |
| 4,694,144 | 9/1987 | Delaroche . |
| 4,698,276 | 10/1987 | Duval .......... 428/218 |
| 4,732,630 | 3/1988 | Schnebly . |
| 4,849,039 | 7/1989 | Colson et al. . |
| 4,885,190 | 12/1989 | Schnebly . |
| 5,015,317 | 5/1991 | Corey et al. . |
| 5,160,563 | 11/1992 | Kutchmarek et al. . |

FOREIGN PATENT DOCUMENTS

| | | |
|---|---|---|
| 0090174 A1 | 10/1983 | European Pat. Off. . |
| 717072 | 10/1954 | United Kingdom . |
| 832763 | 4/1960 | United Kingdom . |
| 1216469 | 12/1970 | United Kingdom . |
| 1264687 | 2/1972 | United Kingdom . |
| 1308296 | 2/1973 | United Kingdom . |
| 2242470A | 2/1991 | United Kingdom . |

*Primary Examiner*—James J. Bell
*Attorney, Agent, or Firm*—Gary M. Polumbus; Dorsey & Whitney LLP

[57] ABSTRACT

A treated fabric panel for use in fabricating expandable and retractable window coverings, partitions and the like, particularly honeycomb panels. The treated fabric panel is a textile material having at least one area thereof treated with a fabric treatment composition and at least one area thereof left untreated.

29 Claims, 5 Drawing Sheets

TREATED FABRIC PANEL

CROSS-REFERENCE TO RELATED APPLICATIONS

This application is a division of application Ser. No. 07/791,156 filed Nov. 13, 1991 pending.

BACKGROUND OF THE INVENTION

1. Field of the Invention

The present invention relates to an anti-fray treated fabric for use in fabricating expandable and retractable window coverings, partitions and the like, particularly honeycomb panels. The invention further relates to a method of making such an anti-fray treated fabric, to non-fraying expandable and retractable window coverings, partitions and the like made from this anti-fray treated fabric, and to methods of making non-fraying expandable and retractable window coverings, partitions and the like.

2. Description of the Related Art

U.S. Pat. No. 4,450,027 to Colson describes a method and apparatus for fabricating expandable and retractable honeycomb panels by folding a continuous length of material into an open-faced tubular construction, applying longitudinal lines of adhesive to the tubular construction and then stacking successive lengths of the tubular formed material one on top of another such that adjacent lengths of the tubular material are secured to one another by the lines of adhesive. One of the materials which can be used in the Colson process is a non-woven polyester material. Numerous modifications to the basic Colson process have been proposed, for example, in U.S. Pat. Nos. 4,603,072, 4,631,108, 4,631,217, and 4,676,855. In addition, multiple cell row expandable and retractable honeycomb panels made by a process of folding a continuous length of material, applying a number of longitudinal lines of adhesive to the folded material, and then stacking successive lengths of the folded continuous length of material on top of one another to secure the lengths of folded material together is disclosed in co-pending U.S. patent application Ser. No. 07/720,163, filed Jun. 27, 1991. Another type of window covering in which longitudinal lines of adhesive are applied to a continuous length of material is described in co-pending U.S. patent application Ser. No. 07/701,165, filed on May 17, 1991. In this window covering, which is not a honeycomb panel, relatively narrow strips of material extend between two sheets of material and are secured to each sheet of material by a respective longitudinal line of adhesive applied adjacent each longitudinal edge of the strip material.

For aesthetic purposes, efforts have been made to use woven, knit or other textile materials to fabricate expandable and retractable honeycomb panels by the Colson process and modifications thereof. U.S. Pat. No. 4,698,276, for example, describes a specially formed knit fabric sheet having areas of different fabric density. In the fabric of U.S. Pat. No. 4,698,276, areas of high fabric density are provided in an attempt to prevent adhesive seepage through the knit fabric when it is fabricated into a honeycomb panel using the Colson process. The use of the specially formed knit fabric of U.S. Pat. No. 4,698,276 to form honeycomb panels by the Colson process suffers from a number of disadvantages. One such disadvantage is the fact that the fabric must be specially knitted in order to provide the areas of different fabric density.

If a woven textile fabric were to be fabricated into a honeycomb panel, the yarn at the edge of each cell would fray, giving the honeycomb product a poor appearance. After the honeycomb product has been handled several times, the fraying will increase with the unsightly result that several yarns will be left hanging off the honeycomb product's edge. Since these honeycomb products are primarily used as window coverings, room partitions, and the like, their aesthetic qualities are very important and the fraying characteristic of woven textile materials has generally prohibited the use of woven textile materials in honeycomb panels.

SUMMARY OF THE INVENTION

The treated fabric of the present invention is a textile material which has selected portions thereof coated or treated with a fabric treatment composition, such as a flame retardant, soil retardant or, especially, an anti-fray composition. The treatment of the textile material in accordance with the present invention provides a treated material which is suitable for use in fabricating window coverings, room partitions, and the like, particularly honeycomb panels. Portions of the treated fabric of the invention are not coated or treated with the fabric treatment composition to thereby provide untreated portions of the fabric to which adhesive lines may be applied to secure the treated fabric to another fabric portion to fabricate window coverings, room partitions and the like.

According to other aspects of the invention, there are provided a method of producing a treated material; treated window coverings, room partitions, and the like, particularly honeycomb panels, fabricated from the treated fabric of the invention; and methods of fabricating treated window coverings, room partitions, and the like, particularly honeycomb panels, using the treated fabric of the invention.

Therefore, it is an object of the present invention to provide a treated fabric suitable for use in fabricating window coverings, room partitions, and the like to provide window coverings, room partitions, and the like of a textile material which do not suffer from the disadvantageous fraying characteristics of prior textile materials.

Another object of the present invention is to provide a treated fabric having major portions thereof treated with a fabric treatment composition and having minor portions thereof left untreated to provide fabric portions for receiving adhesive lines.

A further object of the present invention is to provide a method for making a treated fabric from a textile material, whereby portions of the textile material are treated with a fabric treatment composition and portions of the textile material are left untreated.

Still another object of the present invention is to provide a treated fabric suitable for use in the fabrication of honeycomb panels by a process in which adhesive lines are applied to a continuous strip of the treated material and then successive lengths of the continuous strip material are stacked and adjacent lengths are secured to one another by the adhesive lines.

Yet a further object of the invention is to provide treated window coverings, room partitions and similar fabric structures, especially honeycomb panels.

An additional object of the invention is to provide methods of producing treated textile material window coverings, room partitions and the like, particularly honeycomb panels, from a treated fabric.

These and other objects and advantages of the present invention will be further understood by reference to the following detailed description and drawings, wherein:

DETAILED DESCRIPTION OF THE INVENTION

Figure 1:
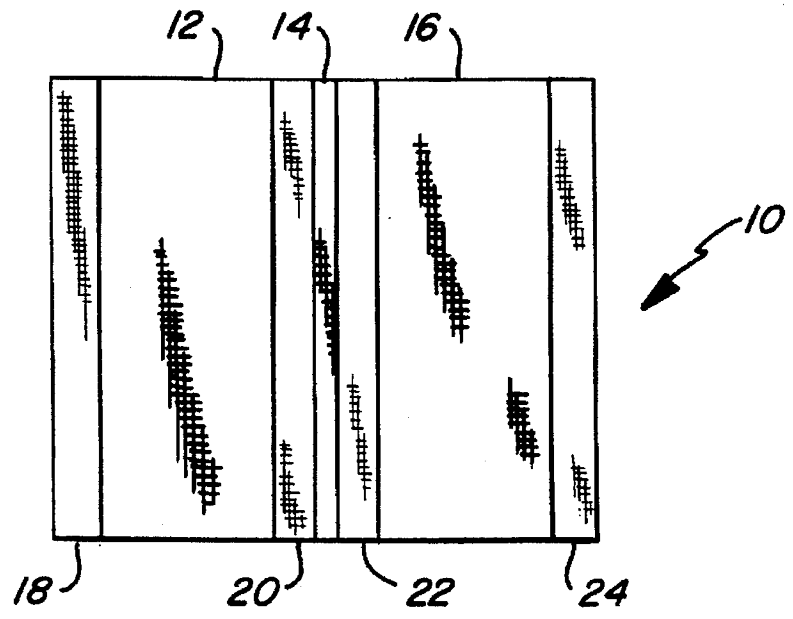
FIG. 1 is a plan view of a first embodiment of a treated fabric according to the present invention.

Referring generally to the drawing figures, there are shown treated fabrics of the present invention and expandable and retractable fabric structures made therefrom. The treated fabrics include treated portions and untreated portions which are suitable for adhesive application thereto. Portions are left untreated to provide adhesive bond sites in the treated fabric so that the treated fabric is suitable for use in a honeycomb panel fabrication process such as the Colson process. It has been discovered that if an entire woven textile material is treated with a fabric treatment composition, such as a flame retardant, soil retardant or anti-fray composition, the resulting fabric has insufficient bond sites for adhesive bonding and the bond strength of an adhesive to a treated fabric portion is insufficient and is significantly less than the bond strength of an adhesive to an untreated material.

The following detailed description relates to one preferred embodiment of the present invention in which the fabric is a woven textile material and the fabric treatment composition is an anti-fray composition. However, it is to be understood that the invention is not limited to woven textile materials or anti-fray compositions. As discussed further below, the fabric can be any desired textile material and the fabric treatment composition can be any composition capable of imparting a desired characteristic to a fabric. More specifically, suitable textile materials include woven, non-woven and knitted materials of man-made or natural fibers. Examples of fabric treatment compositions useful in the present invention include, but are not limited to, soil retardant compositions, flame retardant compositions and anti-fray compositions.

Referring now to FIG. 1, there is shown an anti-fray treated fabric 10 of the present invention. The anti-fray treated fabric 10 includes anti-fray treated portions 12, 14, 16 and untreated portions 18, 20, 22, 24 which are suitable for adhesive application thereto. The anti-fray treated fabric 10 is produced from a conventional woven textile material by treating portions of the woven textile material with an anti-fray composition. The woven textile material has a plurality of small interstices of any shape, e.g., square, rectangular or diamond-shaped. Suitable woven textile materials are those of man-made or natural fiber woven construction. An especially preferred woven textile material is a woven pongee, which is a 70 denier texturized polyester having a weight of about 1.6 oz/square yard and a yarn count of 78×98 yarns per inch as a greige material.

The anti-fray treated fabric 10 can be produced by any suitable fabric treatment or coating process capable of applying an anti-fray composition to selected, predetermined portions of a textile material while leaving other portions thereof untreated. To produce the anti-fray treated fabric 10, as well as other preferred embodiments of the present invention, the anti-fray treatment or coating process is one in which alternate, substantially parallel, longitudinally extending portions of a woven material are treated with the anti-fray composition while the remaining portions of the woven material are left untreated.

One preferred process and apparatus for producing the anti-fray treated fabric 10 is an offset gravure process using conventional offset gravure apparatus. Preferably, the woven material is cut to a desired width and then the anti-fray composition is applied by the offset gravure coating process.

In an especially preferred offset gravure process of the present invention, a tenter frame is used and the woven material is pulled lengthwise, i.e., in the machine direction, while the pins or hooks on the sides of the tenter frame maintain the woven material under a substantially constant tension in the widthwise direction of the woven material, i.e., the cross-direction. It has been unexpectedly found that by increasing the machine-direction or lengthwise tension on the woven material prior to and during application of the anti-fray composition, the machine-direction stiffness of the anti-fray treated fabric is advantageously and significantly increased with only a slight increase in cross-direction stiffness of the anti-fray treated fabric. A high ratio of machine-direction stiffness to cross-direction stiffness is desirable in the anti-fray treated fabric, particularly when the anti-fray treated fabric is to be fabricated into a honeycomb panel. Depending upon the type and number of yarns in the woven textile material, the ratio of machine-direction stiffness to cross-direction stiffness for an anti-fray fabric of this invention can range from between about 3:1 to 50:1, or more.

It is believed that increasing the machine-direction tension on the woven material on the tenter frame causes the warp yarn filaments to draw in tightly and then the applied anti-fray composition bonds these warp yarn filaments together such that the bonded filaments act as one much stiffer yarn. The lack of tension in the cross-direction allows the fill direction filaments to remain fluffy and, therefore, to not bond as easily to one another when the anti-fray composition is applied.

In this process of treating the woven textile material to produce the anti-fray treated fabric 10, it is important that the portions 12, 14, 16 be completely saturated with the anti-fray composition to provide optimal anti-fray protection to portions 12, 14, 16 of the anti-fray treated fabric 10. The efficiency of the anti-fray treatment is directly related to the ability of the anti-fray composition to fill every inter-fiber interstice. By filling each interstice, the individual fibers of the portions 12, 14, 16 are bound and fraying is prevented. Preferably, the anti-fray composition is applied to the woven textile material in portions 12, 14, 16 in an amount of about 20 to 25% by weight solids add on.

The anti-fray composition with which the woven textile material is treated can be any composition, such as a binder composition, capable of filling the interstices in the woven textile material to bind the individual fibers. Examples of suitable types of anti-fray compositions include elastomers which are capable of binding the individual fibers of the woven textile material to prevent fraying and which are resistant to ultraviolet (UV) radiation and to breakdown or degradation due to other environmental factors. Especially preferred anti-fray compositions are elastomeric acrylics and elastomeric urethane-type compositions. One particularly preferred anti-fray composition is a latex emulsion which is a mixture of about 15 to 25% by weight of an acrylic and about 75 to 85% by weight of an elastomer. In addition, the preferred anti-fray composition may include minor amounts of conventional latex emulsion additives such as a defoamer, a synthetic thickener, and the like. An especially suitable anti-fray composition is a latex emulsion containing 71% by weight of the elastomer sold under the tradename V-29 by B. F. Goodrich; 27% of the acrylic binder sold under the tradename HA-16 by Rohm & Haas; 1.5% by weight of the defoamer sold under the tradename Nalco 2305; and 0.5% by weight of the synthetic thickener sold under the tradename UCAR SCT-270 by Union Carbide.

Figure 2:
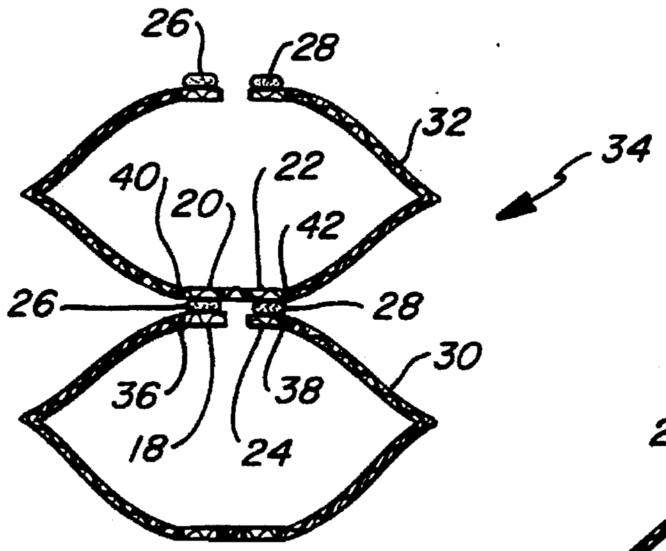
FIG. 2 is a fragmentary, schematic vertical sectional view of a single cell row honeycomb panel fabricated from the treated fabric of FIG. 1.

Referring now to FIG. 2, there is shown a single cell row honeycomb panel 34, of the type produced by the Colson process, fabricated from the anti-fray treated fabric 10. The details of the Colson process, and modifications thereof, for producing single cell row honeycomb panels are described in U.S. Pat. Nos. 4,450,027, 4,603,072, 4,631,108, 4,631,217, and 4,676,855, the disclosures of which are incorporated herein by reference.

As seen in FIG. 2, adhesive lines 26, 28 are applied to untreated portions 18, 24, respectively, of the anti-fray treated fabric 10 and untreated portions 18, 24 of one folded anti-fray treated fabric strip 30 are secured to untreated portions 20, 22 of an adjacent folded anti-fray treated fabric strip 32 by adhesive lines 26, 28, respectively. When adjacent anti-fray treated fabric strips are joined to form a honeycomb panel 34, after the adhesive lines 26, 28 are allowed to cure, untreated portions 18, 20, 22, 24 are prevented from fraying by the cured adhesive, thereby providing a non-fraying honeycomb panel 34.

Treatment of the portions 12, 14, 16 with the anti-fray composition has the additional advantage of stiffening the woven textile material in those portions to achieve a desirable cell structure and product appearance when the anti-fray treated fabric 10 is fabricated into a honeycomb panel as shown in FIG. 2. Although the anti-fray treatment of the present invention stiffens the treated portions 12, 14, 16 of the anti-fray treated fabric 10, this increased fabric stiffness does not adversely affect the shade drop or cells per inch of a honeycomb panel fabricated from the anti-fray treated fabric 10 because hinge points 36, 38, 40, 42 are created at the treated portion/untreated portion line of demarcation.

Figure 2A:
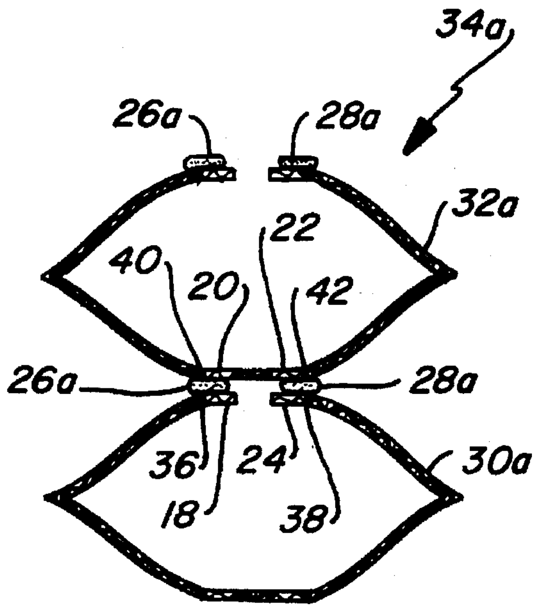
FIG. 2A is a fragmentary, schematic vertical sectional view of another embodiment of a single cell row honeycomb panel fabricated from the treated fabric of FIG. 1.

FIG. 2A shows another example of a single cell row honeycomb panel **34*a*, of the type produced by the Colson process, fabricated from the anti-fray treated fabric 10 of FIG. 1. The honeycomb panel 34*a* of FIG. 2A differs from the honeycomb panel 34 of FIG. 2 due to the location of the adhesive lines 26*a* and 28*a*. In honeycomb panel 34*a*, about 80% of the adhesive line 26*a* extends over untreated portions 18 and 20 of the folded anti-fray treated fabric strips 30*a*, 32*a*, respectively. The remaining 20% of the adhesive line 26*a* extends over treated portions 12 of the anti-fray treated fabric strips 30*a*, 32*a*, adjacent the untreated portions 18, 20, respectively. Similarly, about 80% of the adhesive line 28*a* extends over untreated portions 24, 22 of the folded anti-fray treated fabric strips 30*a*, 32*a*, respectively, and about 20% of the adhesive line 28*a* extends over adjacent treated portions 16 of the folded anti-fray treated fabric strips 30*a*, 32*a***.

Extending the adhesive lines over a minor part of the treated portion adjacent the untreated portions bonds these treated portions together sufficiently to ensure that no part of the untreated portions of the anti-fray treated fabric strips **30*a*, 32*a* are visible in the completed single cell row honeycomb panel 34*a*. In addition, extending the adhesive lines as shown in FIG. 2A** protects the fibers from UV degradation. Of course, it is to be understood that this technique of positioning the adhesive lines such that the adhesive lines bond together treated portions adjacent the bonded untreated portions of the anti-fray fabric can be used in the fabrication of other honeycomb panels and window coverings, including those described hereinafter, from the anti-fray fabric of this invention.

Figure 3:
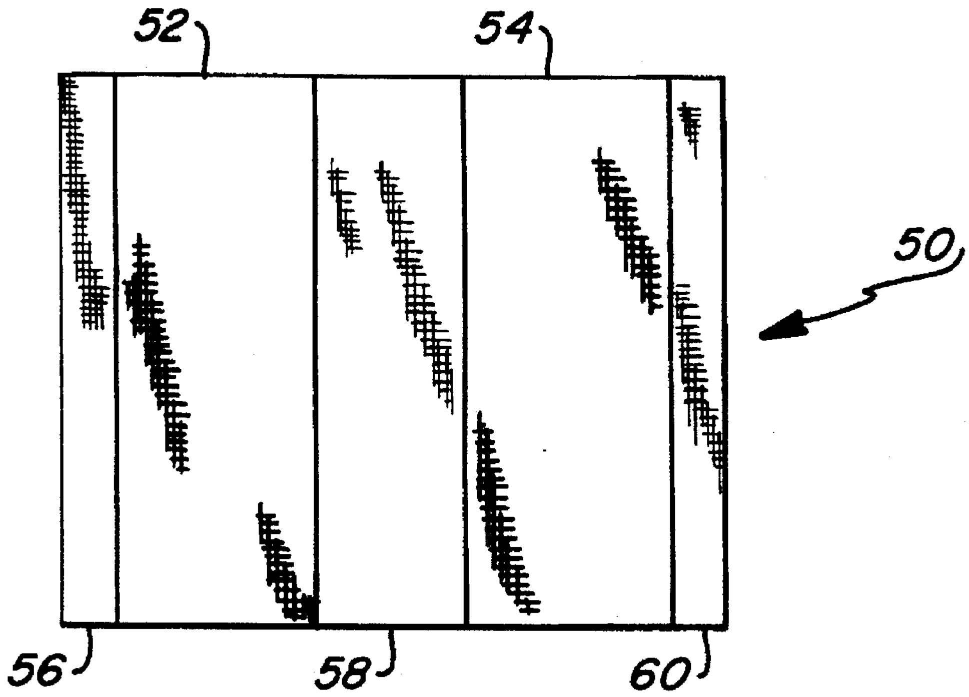
FIG. 3 is a plan view of a second embodiment of a treated fabric according to the present invention.
Figure 4:
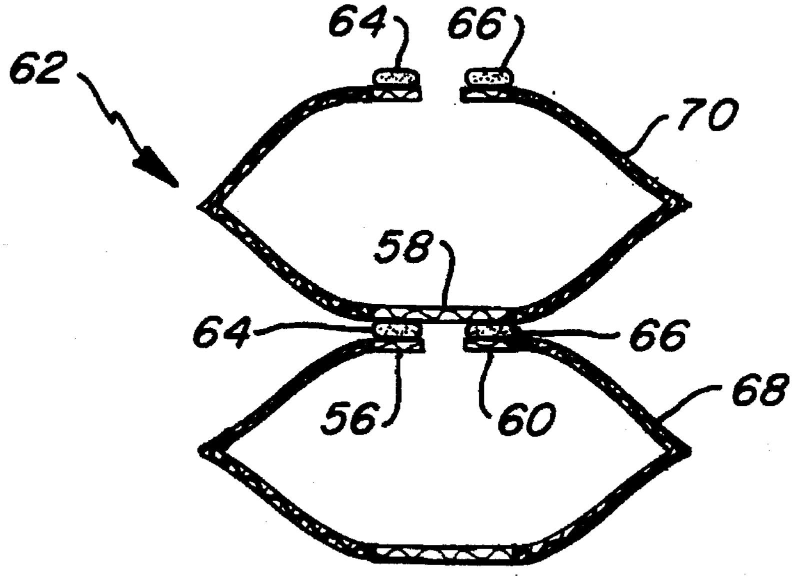
FIG. 4 is a fragmentary, schematic vertical sectional view of a single cell row honeycomb panel fabricated from the treated fabric of FIG. 3.

FIG. 3 shows an alternate embodiment of an anti-fray treated fabric 50 suitable for use in fabricating a single cell honeycomb panel similar to that shown in FIG. 2. Anti-fray treated fabric 50 includes anti-fray treated portions 52, 54 and untreated portions 56, 58, 60. In comparison to the anti-fray treated fabric 10 of FIG. 1, anti-fray treated fabric 50 has a wider central untreated portion 58 instead of two, narrower intermediate untreated portions 20, 22. The anti-fray treated fabric 50 can be fabricated into a single cell row honeycomb panel 62, as shown in FIG. 4, using the process described above with reference to FIGS. 1 and 2. As seen in FIG. 4, adhesive lines 64, 66 are applied to untreated portions of 56, 60 of a strip 68 of anti-fray treated fabric 50 and then untreated portions 56, 60 of strip 68 are secured to untreated portion 58 of an adjacent strip 70 of anti-fray treated fabric 50 by adhesive lines 64, 66, respectively.

Figure 5:
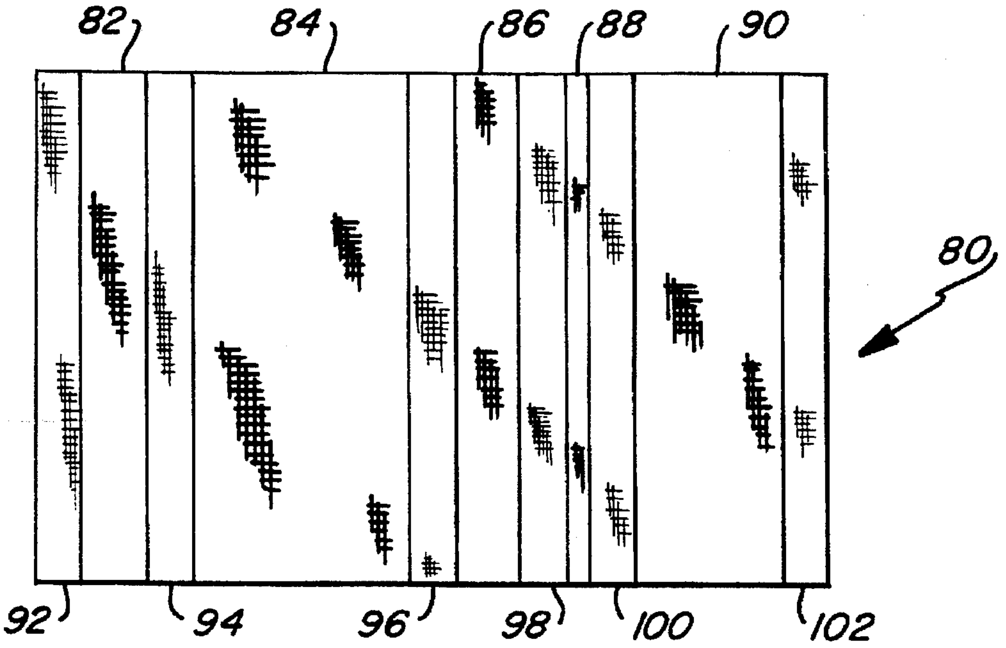
FIG. 5 is a plan view of a third embodiment of a treated fabric according to the present invention.
Figure 7:
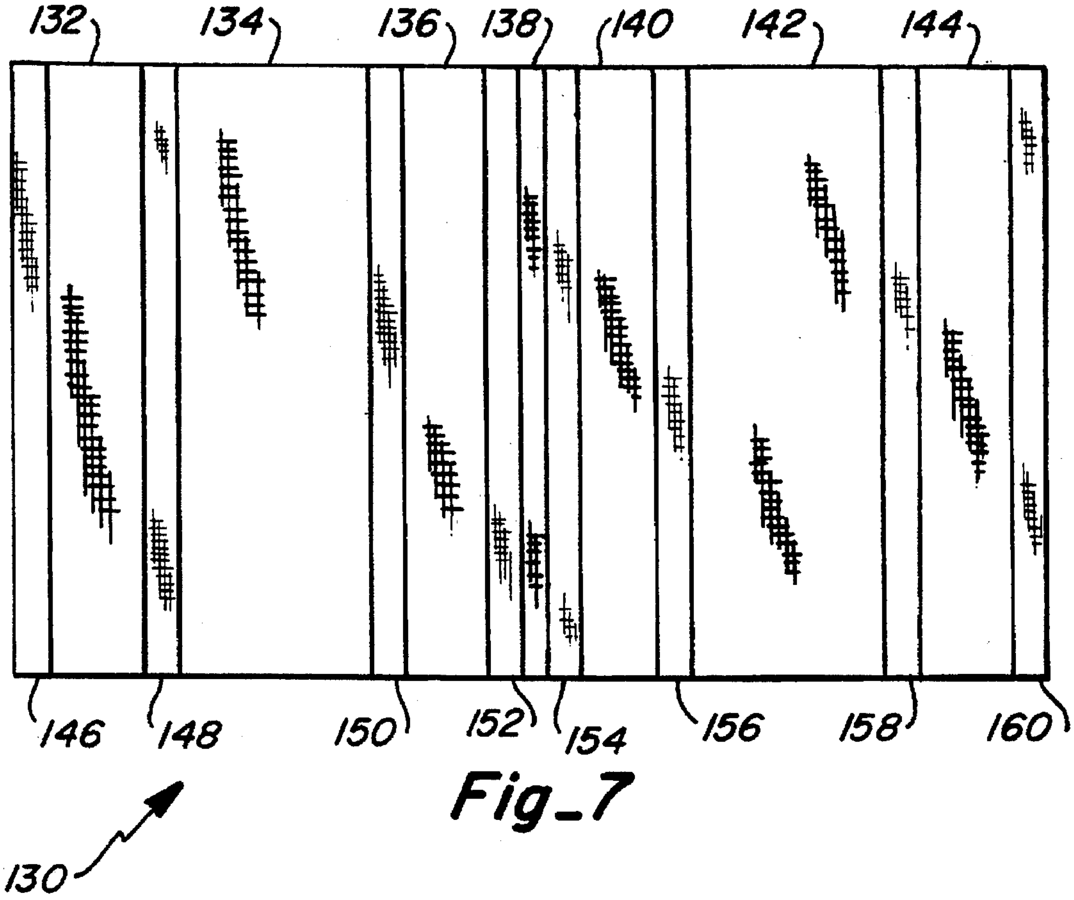
FIG. 7 is a plan view of a fourth embodiment of a treated fabric according to the present invention.

FIGS. 5 and 7 show further embodiments of anti-fray treated fabrics, which are suitable for fabricating multiple cell row honeycomb panels. Methods and apparatus for fabricating multiple cell row honeycomb panels are described in co-pending U.S. patent application Ser. No. 07/720,163 filed Jun. 27, 1991, the disclosure of which is incorporated herein by reference.

Figure 6:
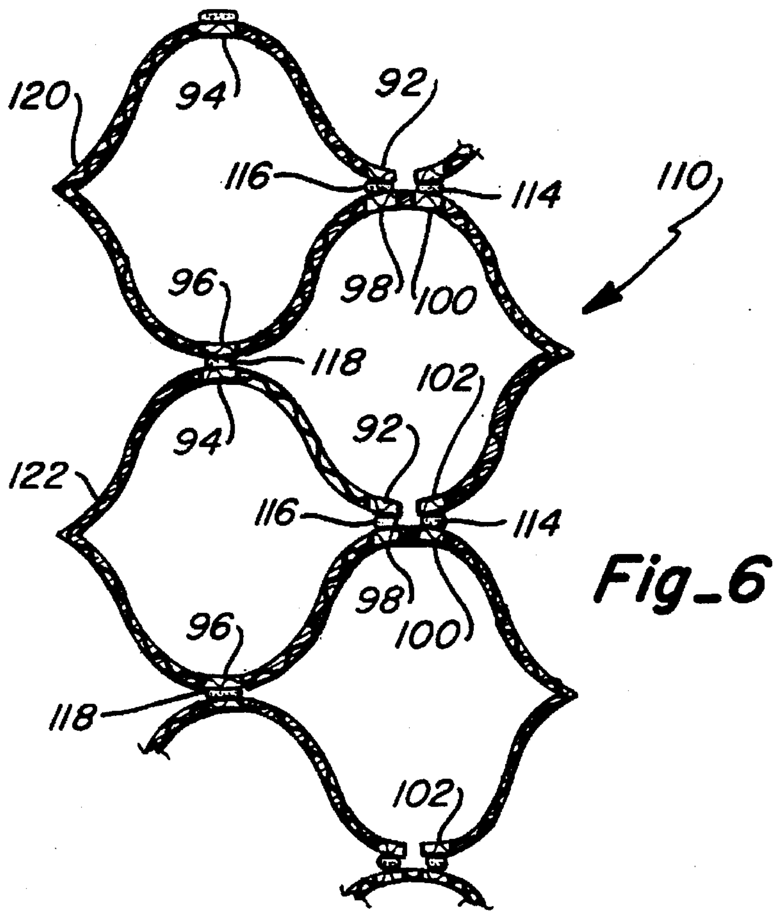
FIG. 6 is a fragmentary, schematic vertical sectional view of a double cell row honeycomb panel fabricated from the treated fabric of FIG. 5.

FIG. 5 shows an anti-fray treated fabric 80 suitable for fabricating a double cell row honeycomb panel 100, as shown in FIG. 6. The anti-fray treated fabric 80 has treated portions 82, 84, 86, 88, 90 and untreated portions 92, 94, 96, 98, 100, 102. As seen in FIG. 6, to fabricate a double cell row honeycomb panel 110 from the anti-fray treated fabric 80, adhesive lines 114, 116, 118 are applied to folded strips 120, 122 of the anti-fray treated fabric 80 to form the double cell row honeycomb panel 110. Adhesive line 114 secures untreated portion 100 of one strip 122 to untreated portion 102 of adjacent strip 120; adhesive line 116 secures untreated portion 98 to untreated portion 92 of the same strip 120 or 122; and adhesive line 118 secures untreated portion 96 of one strip 120 to untreated portion 94 of adjacent strip 122.

Figure 8:
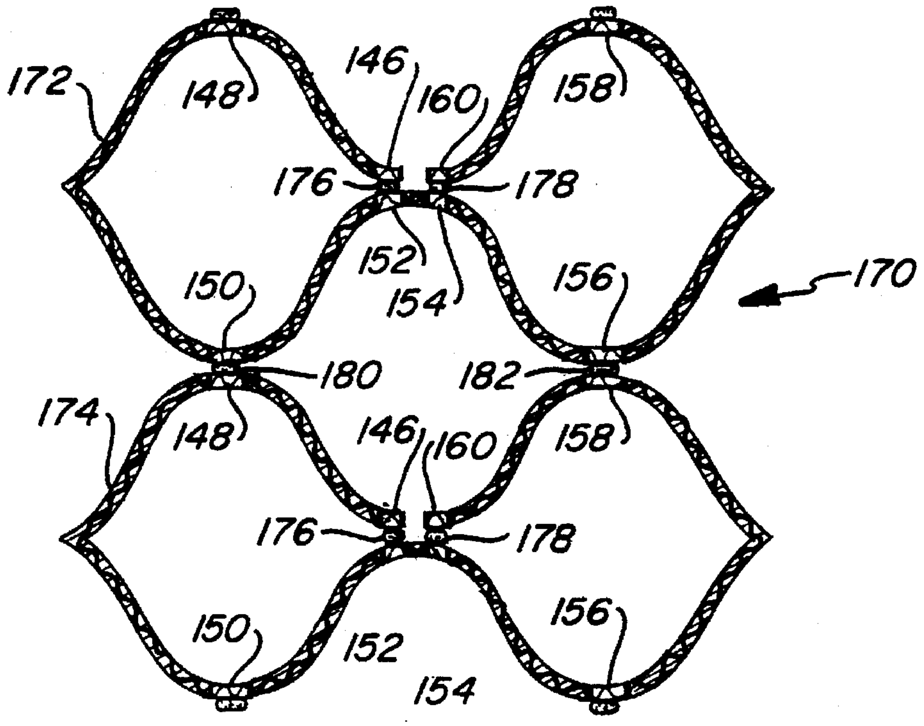
FIG. 8 is a fragmentary, schematic vertical sectional view of a triple cell row honeycomb panel fabricated from the treated fabric of FIG. 7.

FIG. 7 shows an anti-fray treated fabric 130 suitable for fabricating a triple cell row honeycomb panel 170, as shown in FIG. 8. The anti-fray treated fabric 130 has treated portions 132, 134, 136, 138, 140, 142, 144 and untreated portions 146, 148, 150, 152, 154, 156, 158, 160. As seen in FIG. 8, to fabricate a triple cell row honeycomb panel 170 from the anti-fray treated fabric 130, adhesive lines 176, 178, 180, 182 are applied to folded strips 172, 174 of the anti-fray treated fabric 130 to form the triple cell row honeycomb panel 170. Adhesive line 180 secures untreated portion 150 of one strip 172 to untreated portion 148 of adjacent strip 174; adhesive lines 176, 178 secure untreated portions 146, 160 to, untreated portions 152, 154, respectively, of the same strip 172 or 174; and adhesive line 182 secures untreated portion 156 of one strip 172 to untreated portion 158 of adjacent strip 174.

Multiple cell row honeycomb panels having four, five or more cell rows, as disclosed in U.S. patent application Ser. No. 07/720,163, filed Jun. 27, 1991 can also be produced from an anti-fray treated fabric of the present invention. To produce an anti-fray treated fabric for such other multiple cell row honeycomb panels, a woven textile fabric is treated with an anti-fray composition to provide an anti-fray treated strip having an appropriate number and placement of untreated portions. To produce a multiple cell row honeycomb panel having N cell rows, an anti-fray treated fabric having 2N+2 untreated portions is required. Thus, an anti-fray treated fabric having 10 untreated portions is required to produce a four cell row honeycomb panel, an anti-fray treated fabric having 12 untreated portions is required to produce a five cell row honeycomb panel, etc.

Figure 9:
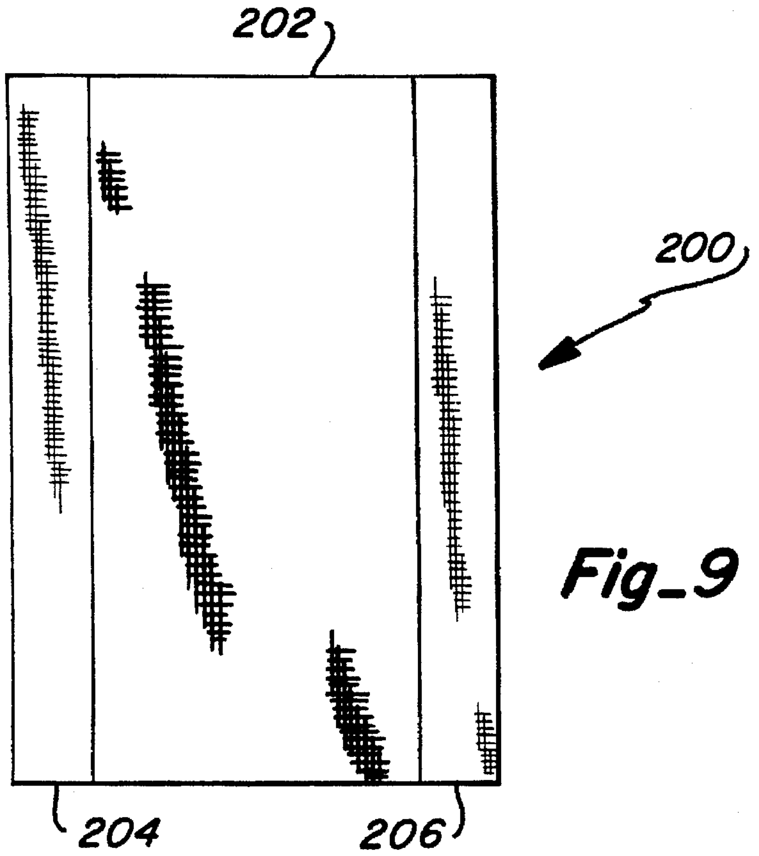
FIG. 9 is a plan view of a fifth embodiment of a treated fabric according to the present invention.

FIG. 9 shows another embodiment of an anti-fray treated fabric 200 according to the present invention. The anti-fray treated fabric 200 has a center, treated portion 202 and two untreated edge portions 204, 206 provided on opposite longitudinal sides of the center, treated portion 202. The anti-fray treated fabric 200 is especially suitable for fabricating the vaned window covering 210 shown in FIG. 10. The window covering 210 can be produced by a process described in co-pending U.S. patent application Ser. No. 07/701,165, filed May 17, 1991, the disclosure of which is incorporated herein by reference.

Figure 10:
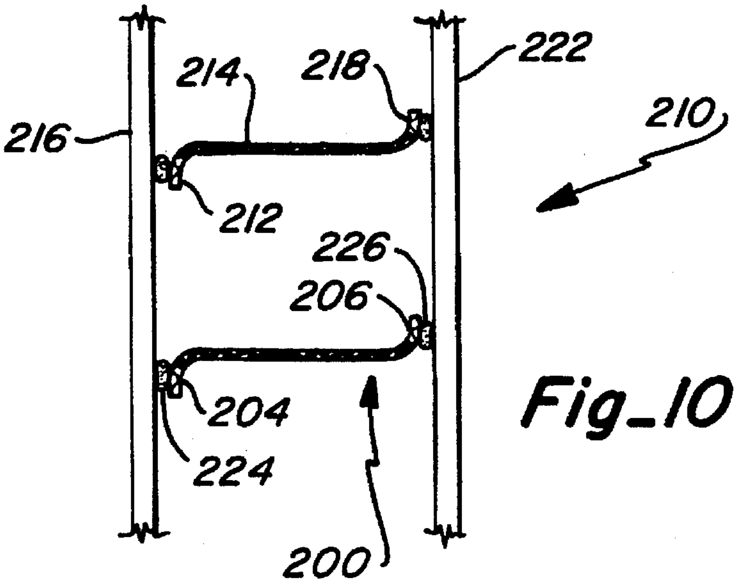
FIG. 10 is a fragmentary, schematic vertical sectional view of a window covering having vanes fabricated from the treated fabric of FIG. 9.

Briefly, the window covering 210 is produced by adhesively bonding one longitudinal edge 212 of a strip material 214 to one sheet 216 and adhesively bonding the other longitudinal edge 218 of the strip material 214 to another sheet 222 such that the strip material 214 extends between the sheets 216, 222 like a vane. By moving the two sheets 216, 222 relative to one another, the vanes 214 move thereby opening and closing the window covering 210. The anti-fray treated fabric 200 is particularly suited for use as the strip material 214 in the window covering 210. Adhesive is applied to the untreated edge portions 204, 206 of the anti-fray treated fabric 200, and then the anti-fray treated fabric strip is adhesively bonded to the two sheets 216, 222 by adhesive lines 224, 226 as shown in FIG. 10.

The details of the structure and processes relating to an anti-fray treated fabric set forth above are equally applicable to other types of textile materials and fabric treatment compositions. Those familiar with the fabric treatment field will readily appreciate how to impart any desired fabric characteristic, e.g., soil retardance or flame retardance, to a wide variety of textile materials including woven, non-woven and knitted materials based on the foregoing detailed description of an anti-fray treated fabric. Conventional flame retardant and soil retardant compositions, in the recommended amounts, can readily be used in the process of the invention to produce treated fabrics having the respective characteristics.

As is apparent from the above detailed description of specific embodiments of the present invention, the anti-fray treated fabric of the present invention is suitable for the fabrication of a variety of window coverings, room partitions, and similar structures, particularly honeycomb panels. The relative widths and number of the treated portions and untreated portions will depend upon the intended use of the anti-fray treated fabric. The foregoing is considered as illustrative only of the principles of the invention. Although the invention has been described with reference to preferred embodiments and examples thereof, it is not intended that the present invention be limited to only those described embodiments. The description of the preferred embodiments contained herein is intended in no way to limit the scope of the invention. As will be apparent to a person skilled in the art, modifications and adaptations of the above-described invention will become readily apparent without departure from the spirit and scope of the invention, the scope of which is defined and circumscribed by the appended claims.

We claim:

1. A panel of textile material defining interstices therein and having a uniform single fabric density throughout, comprising a first panel area having a treatment composition thereon capable of filling said interstices and a second panel area free of said treatment composition.

2. A panel as defined in claim 1, comprising two said second areas and said first area is positioned between said second areas.

3. A panel as defined in claim 2, wherein said two second areas are opposed longitudinal edge portions of said textile material and said first area is a center portion of said textile material.

4. A panel as defined in claim 1, comprising at least two said first areas of said textile material and at least three said second areas.

5. A panel as defined in claim 4, wherein said second areas and said first areas extend longitudinally, with said two of said second areas extending along the longitudinal edges of said treated fabric.

6. A panel as defined in claim 5, comprising three first areas and four second areas.

7. A panel as defined in claim 5, comprising five first areas and six second areas.

8. A panel as defined in claim 5, comprising seven first areas and eight second areas.

9. A panel as defined in any one of claims 1–8, wherein the fabric treatment composition is selected from the group consisting of anti-fray, soil resistant and flame retardant fabric treatment compositions.

10. A panel as defined in claim 9, wherein the fabric treatment composition is an anti-fray composition and the textile material is a woven textile material.

11. A panel as defined in claim 10, wherein said woven textile material is a woven pongee.

12. A panel as defined in claim 10, wherein said anti-fray composition is selected from the group consisting of elastomeric acrylics and elastomeric urethanes.

13. A panel as defined in claim 12, wherein said anti-fray composition comprises a latex emulsion of an elastomer and an acrylic.

14. A panel as defined in claim 12, wherein said anti-fray composition further comprises a defoamer and a synthetic thickener.

15. A panel as defined in claim 10, wherein the ratio of the machine-direction stiffness of said fabric to the cross-direction stiffness of said fabric is between about 3:1 and 50:1.

16. A panel of textile material defining interstices and having a uniform single fabric density throughout, comprising a discrete panel area thereof having a treatment composition coating thereon capable of filling said interstices, said panel thereby defining at least two discrete areas having respectively different surface characteristics.

17. A panel as defined in claim 16, wherein the fabric treatment composition is in an amount of about 20–25% by weight solids add on.

18. A panel as defined in claim 16 or 17 wherein said fabric treatment composition is an anti-fray composition.

19. A panel as defined in claim 18, wherein said anti-fray composition comprises an elastomer which is capable of binding individual fibers of the textile material to prevent fraying and which is resistant to breakdown and degradation due to environmental factors.

20. A panel as defined in claim 19, wherein said elastomer is resistant to ultraviolet radiation.

21. A panel as defined in claim 18, wherein said anti-fray composition is a latex comprising a mixture of 15 to 27% by weight of an acrylic binder; 71 to 85% by weight of an elastomer and between 0 and 2% by weight of conventional latex additives.

22. A panel as defined in claim 21, wherein said conventional latex additives comprise a defoamer and a synthetic thickener.

23. A panel as defined in claim 16, wherein said textile material is a fibrous material comprising man-made fibers.

24. A panel as defined in claim 23, wherein said textile material is a woven 70 denier texturized polyester having a weight of about 1.6 oz. per square yard and a yarn count of 78 by 98 yarns per inch.

25. A panel as defined in claim 16, wherein said treated material is an elongate strip provided with two longitudinally extending untreated area edge portions along opposite longitudinal sides.

26. A panel as defined in claim 16 or 25, wherein the number of untreated areas exceeds the number of treated areas by one.

27. A panel as defined in claim 25, wherein the number of untreated areas exceeds the number of cell rows of the panel.

28. A panel as defined in claim 25, wherein the number of treated areas at least equals two times the number of cell rows of the panel.

29. A panel of fabric used in cellular structures, said fabric defining interstices therein, comprising a first panel area and a second panel area the sum of which represents the full area of said panel of fabric, said first panel area having a first treatment composition thereon capable of filling said interstices and said second panel area being free of said first treatment composition to enable application of a second treatment composition onto said second panel area so that substantially the full area of said panel of fabric is treated in said cellular structure.

* * * * *